(12) United States Patent
LaVigne et al.

(10) Patent No.: US 7,756,124 B2
(45) Date of Patent: *Jul. 13, 2010

(54) ENCAPSULATING PACKETS FOR NETWORK CHIP CONDUIT PORT

(75) Inventors: Bruce E. LaVigne, Roseville, CA (US); John A. Wickeraad, Granite Bay, CA (US); Lewis S. Kootstra, Roseville, CA (US); Jonathan M. Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

This patent is subject to a terminal disclaimer.

(21) Appl. No.: 11/088,394

(22) Filed: Mar. 23, 2005

(65) Prior Publication Data

US 2006/0215653 A1 Sep. 28, 2006

(51) Int. Cl.
*H04L 12/50* (2006.01)
*H04Q 11/00* (2006.01)
*H04L 12/28* (2006.01)
*H04J 1/02* (2006.01)

(52) U.S. Cl. .............. 370/367; 370/392; 370/467; 370/497

(58) Field of Classification Search ............... 370/389, 370/392, 367, 401, 466, 467, 497
See application file for complete search history.

(56) References Cited

U.S. PATENT DOCUMENTS

| 5,793,764 | A | * | 8/1998 | Bartoldus et al. | 370/390 |
| 6,023,478 | A | * | 2/2000 | Kilk et al. | 370/535 |
| 6,601,126 | B1 | * | 7/2003 | Zaidi et al. | 710/305 |
| 6,762,763 | B1 | * | 7/2004 | Migdal et al. | 345/506 |
| 7,009,989 | B2 | * | 3/2006 | Lavigne et al. | 370/413 |
| 2002/0161847 | A1 | * | 10/2002 | Weigand et al. | 709/213 |
| 2004/0174890 | A1 | * | 9/2004 | Chen et al. | 370/402 |
| 2005/0027881 | A1 | * | 2/2005 | Figueira et al. | 709/238 |
| 2005/0078601 | A1 | * | 4/2005 | Moll et al. | 370/218 |

* cited by examiner

*Primary Examiner*—Chi H Pham
*Assistant Examiner*—Farah Faroul

(57) ABSTRACT

Systems, methods, and devices are provided for moving packets on a network device. One method includes receiving packets to a number of network chips, the number of network chips having a conduit port which can be selectively chosen to exchange packets with a processor responsible for processing packets. The method includes adding data for additional functionality to certain packets. Adding data includes encapsulating the certain packets to maintain an appearance of a certain packet format.

26 Claims, 5 Drawing Sheets

ENCAPSULATING PACKETS FOR NETWORK CHIP CONDUIT PORT

BACKGROUND

Internal to many network devices, e.g., switches and routers, there is often a processor responsible for processing packets used in the network device's global operation. These packets may arrive from across the network to any external network port on the network device, e.g., to an external port provided by a network chip installed on the network device. A given network device may have multiple network chips installed thereon with each network chip having multiple external ports. The network chips may be application specific integrated circuits (ASICs). The above described packets received to any of these external ports should be forwarded to the above mentioned processor in an efficient manner. Additionally, the packets from this processor should be capable of being sent out any appropriate external port or to local processing on any network chip.

The multiple network chips on a network device may be interconnected to one another via a high speed interconnect, e.g., a crossbar or internal switching fabric chip. In the past, one approach to providing packets received at the external network ports to a processor on the network device, i.e., the processor responsible for processing the packets used in the network device's global operation, was to put the processor access in a central place such as in the switching fabric. This approach introduces complex port forwarding logic into an otherwise straightforward crossbar switching fabric. Additionally this approach introduces two sets of code to keep in step with one another. Moreover, the approach is not available in a small network chip configuration which may not use a switching fabric chip.

Without added complex forwarding logic, a device may be unable to add data for additional functionality while still passing packets through an internal switch or using existing media access controller (MAC) logic circuitry.

DETAILED DESCRIPTION

Embodiments of the present invention provide for moving packets on a network device. Embodiments include coupling a number of network chips to one another through a high speed interconnect on the device. The number of network chips having a conduit port which can be selectively chosen to exchange packets with a processor responsible for processing packets. Ethernet frame packets are received to any external port on the number of network chips. Additional data for added functionality is provided to certain packets intended for the processor. These certain packets are encapsulated in order to maintain an appearance of a certain frame format.

According to various embodiments, network chips (e.g., ASICs) are provided with an additional network port (hereinafter referred to as a "conduit" port) internal to the device for the purpose of exchanging packets with the processor responsible for processing the packets. The additional conduit port is a media access control-physical layer (MAC-PHY) type port and includes logic circuitry associated therewith to achieve the embodiments described herein.

Figure 1:
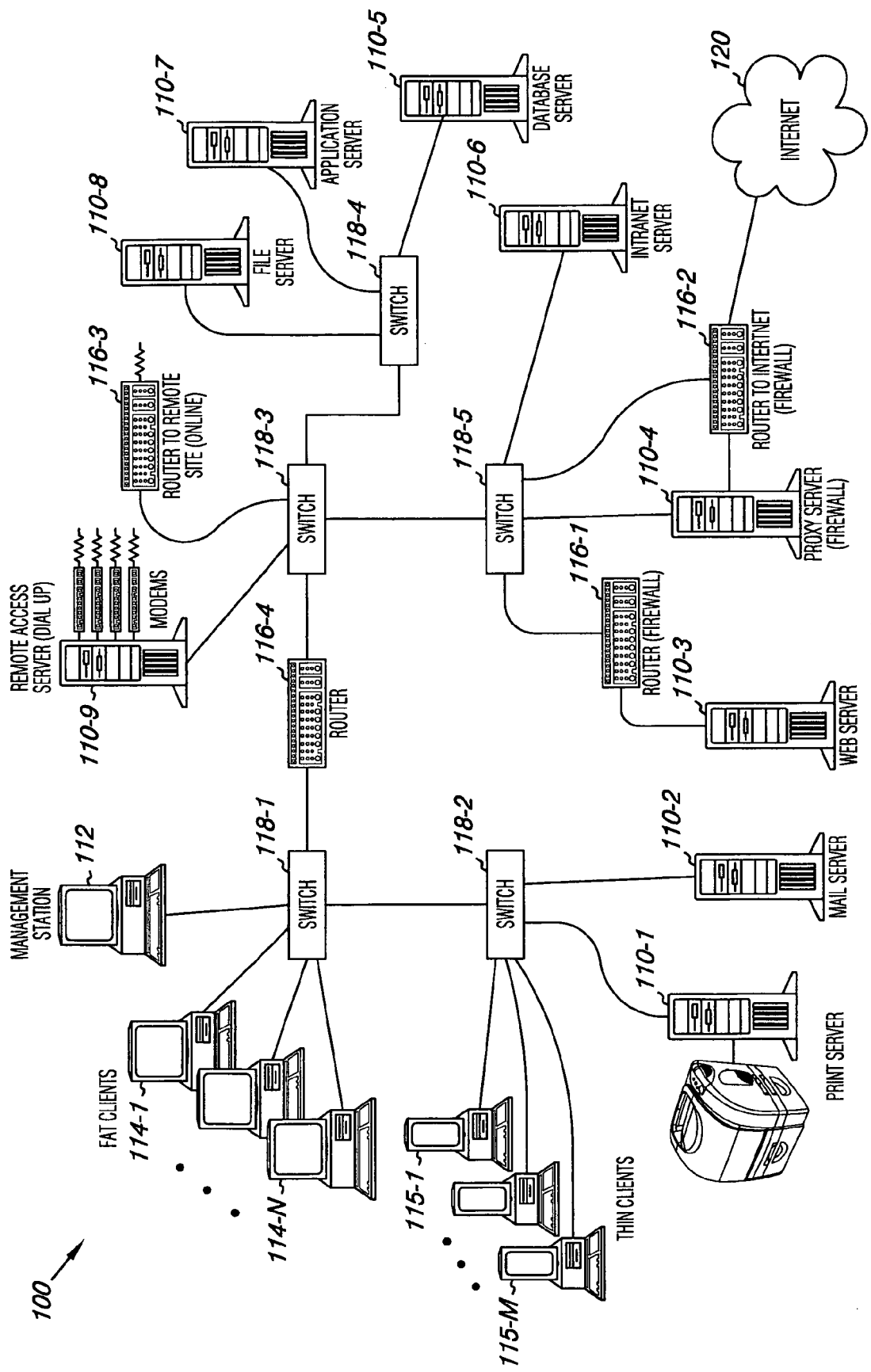
FIG. 1 is an embodiment of a computing device network.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like (referred to herein as "network devices"). The embodiment of FIG. 1 illustrates clients and servers in a LAN. However, embodiments of the invention are not so limited. For example, the embodiment of FIG. 1 shows various servers for various types of service on a LAN.

The exemplary network of FIG. 1 illustrates a print server 110-1 to handle print jobs for the network 100, a mail server 110-2, a web server 110-3, a proxy server (firewall) 110-4, a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction device, and the like.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. The network of FIG. 1 is further illustrated connected to the Internet 120 via router 116-2. Embodiments of the invention, however, are not limited to the number and/or type of network devices in FIG. 1's illustration. The network of FIG. 1 is further illustrated connected to the Internet 120 via router 116-2.

As one of ordinary skill in the art will appreciate, many of these devices include processor and memory hardware. By way of example and not by way of limitation, the network management station 112 will include a processor and memory as the same are well known to one of ordinary skill in the art. Similarly, the network devices of routers, 116-1, 116-2, 116-3, and 116-4, and hubs and/or switches 118-1, 118-2, 118-3, 118-4, and 118-5 may include processor and memory resources. Embodiments of the invention are not limited, for the various devices in the network, to the number, type, or size of processor and memory resources.

Program instructions (e.g., computer executable instructions), as described in more detail below, can reside on the various network devices. For example, program instructions in the form of firmware, software, etc., can be resident on the network 100 in the memory of a network management station 112 and/or one or more routers, 16-1, 116-2, 116-3, and 116-4, and hubs and/or switches 118-1, 118-2, 118-3, 118-4, and 118-5, and be executable by the processor(s) thereon. As the reader will appreciate, program instructions can be resident in a number of locations on various network devices in the network 100 as employed in a distributed computing network.

By way of further example, program instructions in conjunction with a network management program can employ a protocol such as simple network management protocol (SNMP), routing information protocol (RIP), address resolution protocol (ARP), etc., to exchange data and collect response information from the various network attached devices shown in FIG. 1. That is, various network devices are employed to exchange network control signals and to transfer data packets, such as Ethernet frame packets as the same are known and understood, across the network 100 for various usage.

A processor on a given network device may communicate with other network devices using SNMP, RIP, ARP, or other networking protocols. Additionally, the processor on a given network device may communicate with local processors on network chips (described in more detail in connection with FIGS. 2A and 2B) using a proprietary protocol, SNMP, RIP, ARP, or other networking protocols.

Figure 2A:
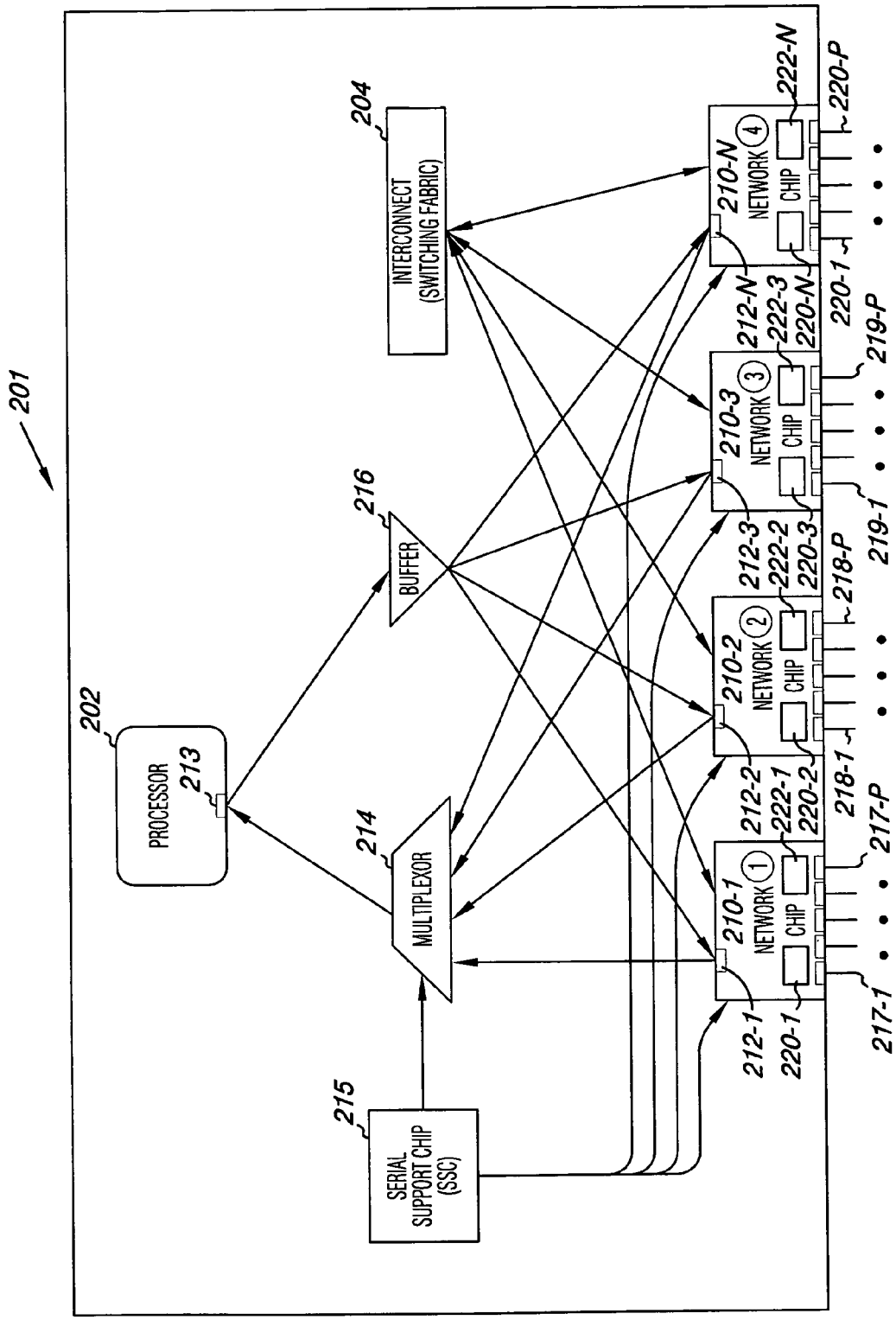
FIG. 2A illustrates an embodiment for a network device providing a conduit between a processor and network chips thereon.

FIG. 2A illustrates an embodiment for a network device 201 providing a conduit between a processor and network chips thereon. That is, FIG. 2A can represent a switch and/or router such as those illustrated and discussed in connection with FIG. 1. As shown in FIG. 2A, the network device 201 includes at least one processor 202 responsible for processing packets, used in the network device's operation, which are received to network chips on the device, e.g., network chips 210-1, 210-2, 210-3, . . . , 210-N. The network chips may be application specific integrated circuits (ASICs). The designator "N" is used to indicate that a number of network chips can be included on the network device 201. Each of these network chips may have access to processor and memory resources, shown as 220-1, 220-2, 220-3, . . . , 220-N and 222-1, 222-2, 222-3, . . . , 222-N respectively. As illustrated in FIG. 2A, the number of network chips 210-1, 210-2, 210-3, . . . , 210-N can be connected to one another through a high speed interconnect, e.g., switching fabric or crossbar circuit, 204 as the same are known and understood by one of ordinary skill in the art. Embodiments are not limited to the number of network chips included on a given network device 201.

Each of the number of network chips 210-1, 210-2, 210-3, . . . , 210-N are provided with external ports to handle the exchange of data packets, e.g., Ethernet packets, (hereinafter "packets") to and from the network device 201. For example, the network chip 210-1 is illustrated with external ports 217-1, . . . , 217-P. Network chip 210-2 is illustrated with external ports 218-1, . . . , 218-P. Network chip 210-3 is illustrated with external ports 219-1, . . . , 219-P. Network chip 210-N is illustrated with external ports 220-1, . . . , 220-P. The designator "P" is used to indicate that a number of external ports can be included on a given network chip. Each of the network chips, however, does not have to include the same number of external ports. For example, one network chip, e.g., 210-1, could include 24 external ports where "P"=24, and another network chip, e.g., 210-3, could include 32 external ports where "P"=32, etc.

As noted above, internal to switches/routers, there is often a processor, e.g., 202, which processes packets of importance to the switch/router's global operation. These packets may arrive from an external network port, e.g., ports 217-1, . . . , 217-P, 218-1, . . . , 218-P, 219-1, . . . , 219-P, 220-1, . . . , 220-P (thus network chips, e.g., 210-1, 210-2, 210-3, . . . , 210-N) and will have to be funneled to the processor 202 in an efficient manner. Previous approaches to doing so were described at the start of this application.

In contrast to earlier approaches, the embodiment of FIG. 2A provides a "conduit path", described in more detail below, for these packets to flow to and from the processor 202, re-using much of the pre-existing forwarding and buffering structure of the switch/router. The number of network chips 210-1, 210-2, 210-3, . . . , 210-N are provided with a designated "conduit port", shown as 212-1, 212-2, 212-3, . . . , 212-N respectively, for the purpose of exchanging packets with a processor, e.g., processor 202 responsible for processing the packets used in the device's 201 operation. FIG. 2A illustrates each of the number of network chips 210-1, 210-2, 210-3, . . . , 210-N being provided with a designated conduit port 212-1, 212-2, 212-3, . . . , 212-N. However, embodiments are not limited to this example and, as the reader will appreciate, there may be a number of additional network chips on a given network device 201 which do not include the herein described conduit port.

In one embodiment the conduit port 212-1, 212-2, 212-3, . . . , 212-N is an additional media access control-physical layer (MAC-PHY) port and includes logic circuitry associated therewith to achieve the embodiments described herein. That is, the additional MAC-PHY ports 212-1, 212-2, 212-3, . . . , 212-N can include MAC-PHY ports such as those used in local area/wide area networks (LAN/WANs) for external ports operating at 10/100/1000/10000 Mb/s speeds as the same will be known and recognized by one of ordinary skill in the art.

Each of these "conduit ports" 212-1, 212-2, 212-3, . . . , 212-N includes a media access control (MAC) functionality. Thus, each of these conduit ports 212-1, 212-2, 212-3, . . . , 212-N has a transmit and a receive side, i.e., output and input side, as part of its hardware structure. And, each of these conduit ports 212-1, 212-2, 212-3, . . . , 212-N is intended to selectively serve as part of a conduit path between the processor responsible for processing packets, e.g., 202, received to a network chip, e.g., 210-1, 210-2, 210-3, . . . , 210-N, and used in the operation of the network device 201.

As shown in FIG. 2A, the processor 202 is separate from the high speed interconnect 204. In one embodiment the processor 202 includes a single conduit port 213 (as "conduit port" has been defined herein) to receive packets from a selected conduit port 212-1, 212-2, 212-3, . . . , 212-N on one of the number of network chips 210-1, 210-2, 210-3, . . . , 210-N. The single conduit port 213 on the processor may similarly be a MAC-PHY port as used in local area/wide area networks (LAN/WANs) operating at 10/100/1000/10000 Mb/s speeds.

The reader will appreciate that the conduit port 213 on the processor 202 to receive packets from the selected conduit port 212-1, 212-2, 212-3, . . . , 212-N on one of the number of network chips 210-1, 210-2, 210-3, . . . , 210-N may be "built-in" to the processor 202. Additionally, the conduit port 213 may be external in the sense that the processor 202 may be a set of integrated circuit chips including processor, network interface card (NIC), and memory resources combined, etc.

The conduit port 213 has a receive side and a transmit side, i.e., input side and output side, as part of its hardware structure. The processor 202 on the network device 201 exchanges packets with a selected conduit port on one of the number of network chips, e.g., conduit port 212-1 on network chip 210-1, through a multiplexor 214 and a buffer 216. That is, the selected conduit port 212-1 is selected, e.g., controlled, by the multiplexor 214 and sends packets to an input side of the processor conduit port 213 associated with the processor 202.

An output of each network chip conduit port 212-1, 212-2, 212-3, . . . , 212-N on the number of network chips 210-1, 210-2, 210-3, ..., 210-N is coupled to the multiplexor 214. In various embodiments, such as the embodiment illustrated in FIG. 2A, a support chip (e.g., serial support chip (SSC)) can be used to choose a selected conduit port, e.g., conduit port 212-1, to send packets to the processor 202. For example, the support chip can include a list of available network chips that can be used and can include a protocol for selecting a network chip to act as the conduit.

The support chip can be connected to the available network chips. In this way, in various embodiments, the support chip can also include a protocol to instruct the network chips which network chip has been selected as the conduit.

In this manner, the functions of selecting a conduit port can be achieved by a separate, and in some cases, dedicated chip. This arrangement can be beneficial for example, because the switching from one conduit on a network chip to another can be effectuated more quickly. An example of illustrating use of a serial support chip is provided in copending, commonly assigned application, entitled, "Support Chip for Handling Network Chips on a Network Device" filed on Feb. 8, 2005, having Ser. No. 11/054,646 and incorporated herein in full by reference.

The support chip can be connected to a multiplexor, such as is shown in FIG. 2A. In such embodiments, the multiplexor 214 can be connected to the support chip 215 and to the conduit ports 212-1, 212-2, 212-3, and 212-N of the number of network chips that can be used as a conduit. In some embodiments, the multiplexor 214 can be used to connect the multiple conduit ports 212-1, 212-2, 212-3, and 212-N of the network chips to a processor 202 having one conduit port 213 thereon. The support chip 215 can communicate a disconnection of the selected network chip to the multiplexor 214. When a list is used to determine the selected network chip, the support chip, based upon the list, can instruct the multiplexor to begin communicating with the selected replacement network chip.

An output side of the conduit port 213 of the processor 202 is broadcast through the buffer 216 to an input side of the selected conduit port, e.g., 212-1. In various embodiments, the buffer 216 broadcasts an output from the conduit port 213 on the processor 202 to an input side of each of the conduit ports 212-1, 212-2, 212-3, ..., 212-N on the number of network chips 210-1, 210-2, 210-3, ..., 210-N. According to various embodiments, hardware filtering logic is provided on each of the network chips 210-1, 210-2, 210-3, ..., 210-N as part of the conduit ports 212-1, 212-2, 212-3, ..., 212-N such that respective network chip can operate on packets received from the processor conduit port 213.

By way of example, and not by way of limitation, a network chip can filter packets based on a media access controller (MAC) destination address (DA) (also referred to as a destination MAC address), e.g., presented as the first 6 bytes in a packet. That is, in one mode, each network chip contains a 6 byte compare register, and if the value of the destination MAC address matches, then the packet is accepted by the particular network chip's conduit port.

In another mode, for example with 32 network chips present, the low 33 bits of the destination MAC address (or DA-MAC) are used as a bitfield. In this example, each network chip knows which bit to look at to accept or drop the packet. In this example, the $33^{rd}$ bit can be special and indicate to allow the one network chip which is currently serving as the conduit port, i.e., the one which the multiplexor has selected in the other direction, to be the only network chip which accepts the packet.

This approach has practicality when a packet is to be sent from the processor 202 out an external port. That is, it is practical to have just one network chip forwarding the packet on without having to give a lot of consideration to which network chip may be best suited. In other words, if the one network chip which is currently serving as the conduit port was good enough to get packets to the processor 202, then it is good enough to get packets out of the processor 202.

In some embodiments, a subset of the conduit ports 212-1, 212-2, 212-3, ..., 212-N on the number of network chips 210-1, 210-2, 210-3, ..., 210-N are coupled to the multiplexor 214. In such embodiments, an output of the processor conduit port 213 is broadcast through the buffer 216 to an input side of the subset of the conduit ports 212-1, 212-2, 212-3, ..., 212-N on the number of network chips 210-1, 210-2, 210-3, ..., 210-N. Additionally, the number of conduit ports receiving packets ("listeners") from the buffer 216 does not have to equal the number of conduit ports which are selectable by the multiplexor 214 to send ("talkers") packets to the processor 202.

In various embodiments, each network chip will know which network chip is currently serving as the conduit port, i.e., the one which the SSC 215 has selected, to send packets to the processor 202. In this manner, each network chip will know which network chip to send packets, e.g., via the interconnect 204, in order to use the conduit.

Thus, packets can be received to an external port, e.g., 217-1, ..., 217-P, 218-1, ..., 218-P, 219-1, ..., 219-P, 220-1, ..., 220-P (thus a network chip, e.g., 210-1, 210-2, 210-3, ..., 210-N), on the device 201 and will be forwarded to the selected conduit port, e.g., 212-1, to which the processor 202 is "listening" via the high speed interconnect 204. The particular conduit port from among the number of conduit ports 212-1, 212-2, 212-3, ..., 212-N is selected by the multiplexor 214 and sends packets to an input side of the processor conduit port 213.

Processed packets are broadcast from the output side of the single conduit port 213 of the processor 202 through the buffer 216 to the input side of the number of conduit ports 212-1, 212-2, 212-3, ..., 212-N where the processed packets can be operated upon and forwarded out an external port, e.g., 217-1, ..., 217-P, 218-1, ..., 218-P, 219-1, ..., 219-P, 220-1, ..., 220-P (thus a network chip, e.g., 210-1, 210-2, 210-3, ..., 210-N on the device 201) via the high speed interconnect 204. Similarly, the processed packets can be forwarded to local processing on the receiving network chip or on another network chip 210-1, 210-2, 210-3, ..., 210-N via the high speed interconnect 204.

Again, as noted above, in various embodiments a subset of the conduit ports 212-1, 212-2, 212-3, ..., 212-N on the number of network chips 210-1, 210-2, 210-3, ..., 210-N are coupled to the multiplexor 214. In such embodiments, an output of the processor conduit port 213 is broadcast through the buffer 216 to an input side of the subset of the conduit ports 212-1, 212-2, 212-3, ..., 212-N on the number of network chips 210-1, 210-2, 210-3, ..., 210-N. Additionally, the number of conduit ports receiving packets ("listeners") from the buffer 216 does not have to equal the number of conduit ports which are selectable by the multiplexor 214 to send ("talkers") packets to the processor 202.

As the reader will appreciate, the processor associated multiplexor and buffer pair 214 and 216, described in connection with FIG. 2A, can be replaced, or used in combination, with an internal (to the device) hub and/or switch.

Figure 2B:
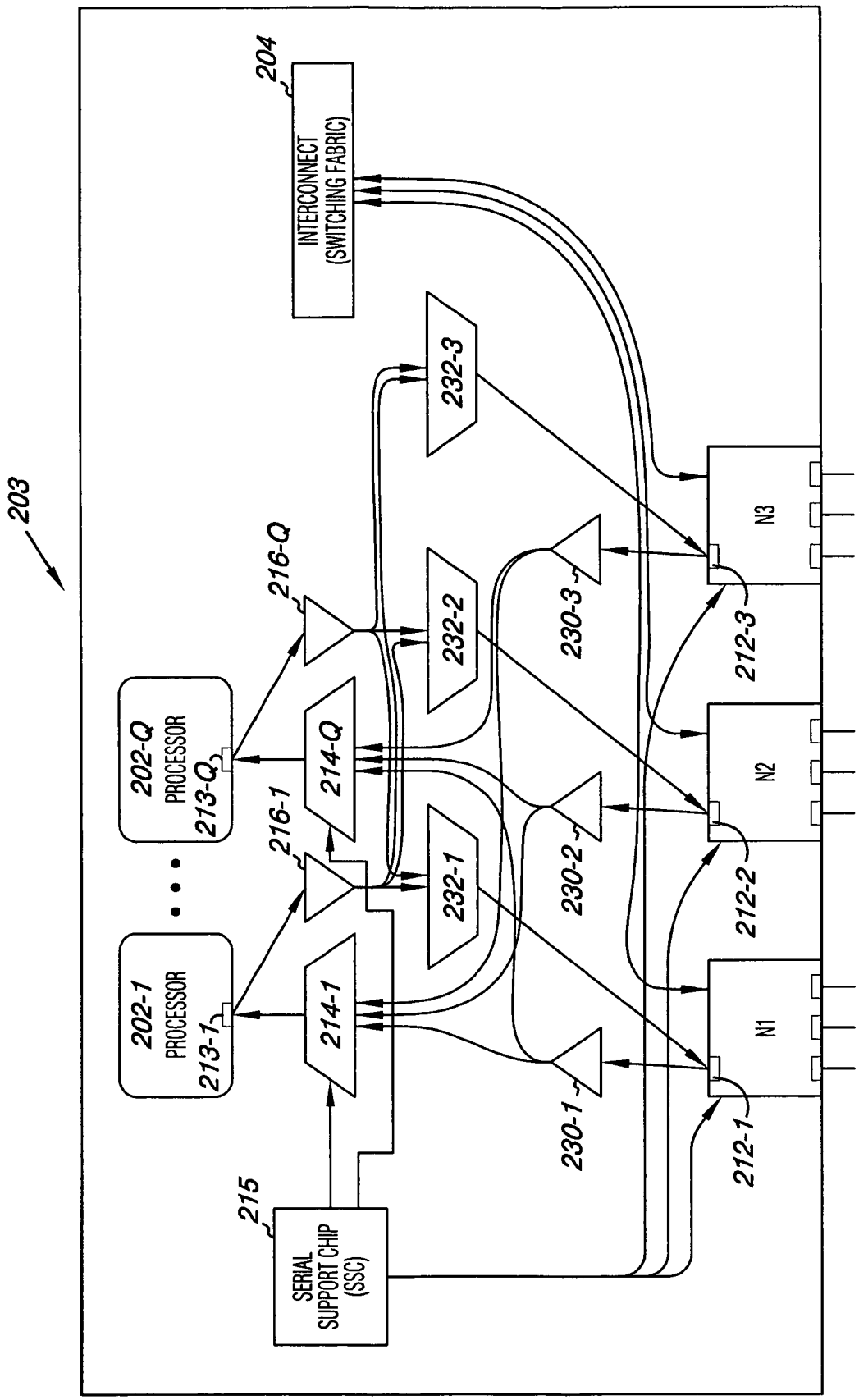
FIG. 2B illustrates another embodiment for a network device providing a conduit between a processor and network chips thereon.

FIG. 2B illustrates another embodiment for a network device 203 providing a conduit between a processor and network chips thereon. The embodiment of FIG. 2B is analogous to the device discussed in connection with FIG. 2A including high speed interconnect 204. FIG. 2B, however, illustrates that a given network device 203 can include a number of processors 202-1, ..., 202-Q to provide redundancy and/or multiple active processor resources on the device 203. In this embodiment, each of the processors 202-1, ..., 202-Q responsible for processing packets exchanged to and from the external ports, e.g., 217-1, ..., 217-P, 218-1, ..., 218-P, 219-1, ..., 219-P, 220-1, ..., 220-P of the network chips 210-1, 210-2, 210-3, ..., 210-N on the device 203 will similarly include a designated conduit port 213-1, ..., 213-Q to exchange packets with the number of network chips 210-1, 210-2, 210-3, ..., 210-N through an associated multiplexor and buffer pair, shown as 214-1, ..., 214-Q, and 216-1, ..., 216-Q, respectively. The designator "Q" is used to indicate that a number of redundant and/or multiple active processors responsible for processing packets exchanged to and from the external ports, e.g., 217-1, ..., 217-P, 218-1, ..., 218-P, 219-1, ..., 219-P, 220-1, ..., 220-P of the network chips 210-1, 210-2, 210-3, ..., 210-N on the device 203.

In FIG. 2B, three network chips are shown for ease of illustration, however, more or less network chips can be utilized. The three network chips illustrated are labeled "N1", "N2", and "N3" and are analogous to the network chips described in connection with FIG. 2A with external ports and a designated conduit port, e.g., 212-1, 212-2, and 212-3, etc. However, as illustrated in the embodiment of FIG. 2B, the output side of each network chip's conduit port 212-1, 212-2, and 212-3 will be connected to a respective, independent buffer 230-1, 230-2, and 230-3 which will broadcast packets to the respective multiplexors 214-1, ..., 214-Q. As described in connection with FIG. 2A, a given multiplexor 214-1, ..., 214-Q will select from which conduit port 212-1, 212-2, and 212-3 to send packets to that multiplexor's associated processor.

As described in connection with FIG. 2A, packets from a particular processor 202-1, ..., 202-Q will be output to that processor's associated buffer, e.g., 216-1, ..., 216-Q. However, as illustrated in the embodiment of FIG. 2B, the broadcast from buffers 216-1, ..., 216-Q will be to a multiplexor 232-1, 232-2, and 232-3 associated with a particular network chip, e.g., N1, N2, and N3, respectively. These multiplexors 232-1, 232-2, and 232-3 will select from which buffer 216-1, ..., 216-Q broadcast to output to the input side of its associated network chip's conduit port, e.g., 212-1, 212-2, and 212-3, respectively.

As the reader will appreciate, network chip "N1" can be selected to "listen" to packet traffic from processor 202-Q via the selection made by multiplexor 214 as directed by SSC 215. Likewise, network chip N1 could be selected by multiplexor 214 as directed by SSC 215 as having the conduit port to send packets to processor 202-1. Additionally, network chip "N3" can be selecting to "listen" to packet traffic from processor 202-1 via the selection made by multiplexor 214 as directed by SSC 215. And likewise, network chip N3 could be selected by multiplexor 214 as directed by SSC 215 as having the conduit port to send packets to processor 202-Q.

Figure 3:
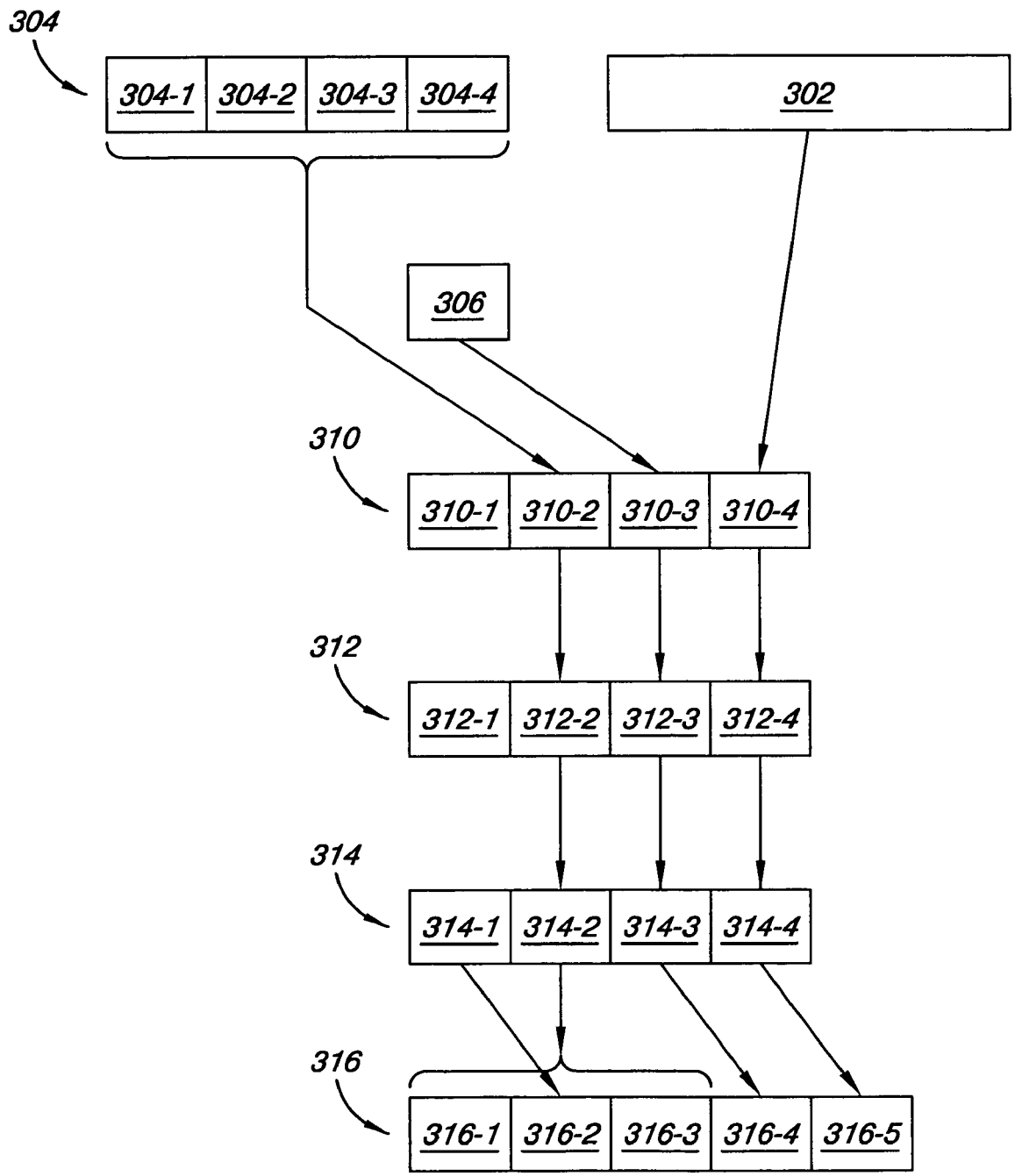
FIG. 3 illustrates a sequence embodiment for data packet configuration.

FIG. 3 illustrates a sequence embodiment for data packet configuration. FIG. 3 illustrates an embodiment for packet encapsulation as packets are received to any network port on a given network chip, as the same has been described above.

As note above, the packets are forwarded to and from a conduit port on a particular network chip selected from among a number of network chips on a network device. This conduit port is responsible for exchanging packets with a processor responsible for processing packets on the network device. The number of network chips, or a subset of them, include logic circuitry for forwarding the packets to and from the conduit port on the particular network chip in accordance with embodiments described herein.

FIG. 3 illustrates one embodiment by which the logic circuitry on a given number of network chips operate on received packets to send the packets from an external port or local processing on a given network chip to a processor responsible for processing the packets on the network device. FIG. 3 illustrates an embodiment by which a network chip is adapted to add additional data for additional functionality to certain packets in order to send the certain packets to the processor. As shown in FIG. 3 a network chip's inbound memory system can receive an Ethernet frame packet 302 from one of its external network ports, as the same will be known and understood.

As shown at block 306, the logic circuitry on the given number of network chips provides additional data for additional functionality 306. The additional data includes, by way of example and not by way of limitation; data for the processor relating to processing the packet; data for prioritizing packets to the processor; data to filter packets based on a media access controller (MAC) destination address (DA); data to add information relating to an external port on which a given packet arrived to the device; data to add information relating to explicit forwarding instructions; and data to add information relating to whether the packet has already been transmitted from an external port.

According to various embodiments, software encapsulation registers 304 are provided which are adapted to enclose both the original Ethernet frame packet 302 and the above described additional data for additional functionality 306. In some embodiments portions of the additional data for additional functionality are included in the encapsulation process as encapsulation data. That is, the SW encapsulation registers can provide; encapsulated data for a destination address (DA) 304-1, encapsulated data for a source address 304-2, encapsulated data for packet length and type information 304-3, and encapsulated data for PAD information 304-4. And, by way of example and not by way of limitation, the encapsulation data can provide additional data to assist in passing the original Ethernet packet 302 through an internal switching fabric and through an internal (to the device) hub and/or switch. Thus, one principle of the embodiments is to add additional data 306 for passing with the packet. However, according to embodiments herein, the additional data 306 is also encapsulated to protect the added additional data 306 while passing through the circuitry described above and to make the original Ethernet packet frame 302, now having such additional data 306, continue to maintain an appearance of an Ethernet frame format. For example, the embodiments so described can add information to correctly forward the packet (e.g., to direct the packet to the processor responsible for processing the packet), can add information for the processor relating to processing the packet, and can add information relating to an external port on which a given packet arrived to the device, etc. As further example, the information relating to processing the packet can include why the packet is being sent to the processor and the packet's priority going to the processor. That is, the information can include data relating to a "copy reason" and data relating to prioritizing packets. As used herein, a "copy reason" can include information on whether the packet is a learn packet, a sample packet, a management packet, etc., as the same are known in the art.

According to various embodiments, data packet structure 310 represents the data packet as it is provided to the switching fabric of the device, e.g., a high speed link. That is, once the above process is performed, logic circuitry can add an internal switch header structure 310-1, as the same will be known and understood by one of ordinary skill in the art, for passing through the switching fabric. Thus, in this embodiment the data packet structure 310 now includes an internal switch header structure 310-1, the encapsulation bytes 310-2, the additional data 310-3 (previously shown as 306), and the original Ethernet packet frame 310-4 (previously shown as 302).

The data packet illustrated at 312 possesses a similar structure to that of 310 except that the internal switch header structure 310-1 may be operated on to create a slightly different internal switch header structure 312-1 as the packet is transmitted across the high speed switching fabric. Data packet structure 312 further includes the encapsulation bytes 312-2 (previously shown as 310-2) the additional data 312-3 (previously shown as 310-3), and the original Ethernet packet frame 313-4 (previously shown as 310-4).

Again, as the reader will appreciate, according to the various embodiments the logic circuitry and software encapsulation registers have operated to maintain an appearance of standard Ethernet frame format while adding the additional data for additional functionality to the Ethernet packet frame 302 originally received to a network chip's inbound memory system from one of that chip's external network ports or from local processing.

The data packet structure illustrated at 314 represents the data packet as it is received to the outbound memory system of the selected network chip having the conduit port to exchange packets with the processor. The data packet 314 possesses a similar structure to that of 312 except that the internal switch header structure 312-1 may be operated on again by the logic circuitry to create a slightly different internal switch header structure 314-1 as the packet is awaiting transmission from the conduit port to the processor. Data packet structure 314 further includes the encapsulation bytes 314-2 (previously shown as 312-2) the additional data 314-3 (previously shown as 312-3), and the original Ethernet packet frame 314-4 (previously shown as 312-4).

Data packet structure 316 represents the data packet as it is received by the processor. As shown illustrated in 316, the data structure can include the encapsulation data, shown previously as 314-2 and now illustrated as 316-1 and 316-3. A first portion of the encapsulation data can include destination and source address information, shown as 316-1. The encapsulation data structure can include another portion 316-2 to serve as tags for the processor as taken from the previous internal switch header structure 314-1, e.g., virtual local area network (VLAN) tags to encode priority. The encapsulation structure can include another portion 316-3 which includes additional encapsulation data provide functionality for the processor such as length and type information, copy reason information, etc. Data packet structure 316 further includes the additional data 316-4 (previously shown as 314-3), and the original Ethernet packet frame 316-5 (previously shown as 314-4).

Since the encapsulation process described herein has been performed, the conduit logic and receiving processor MAC logic, as described earlier in FIGS. 2A and 2B, does not have to be modified to handle the additional data for additional functionality 306. According to the embodiments, once the conduit logic and receiving processor MAC logic have operated on the encapsulation, the processor can then discard or ignore the encapsulation data and operate on the additional data, shown now as 316-4, which includes instructions for the added functionality described herein. Additionally, this encapsulation data may be retained and/or modified if this packet is to be reforwarded back out the conduit to an external network port.

Figure 4:
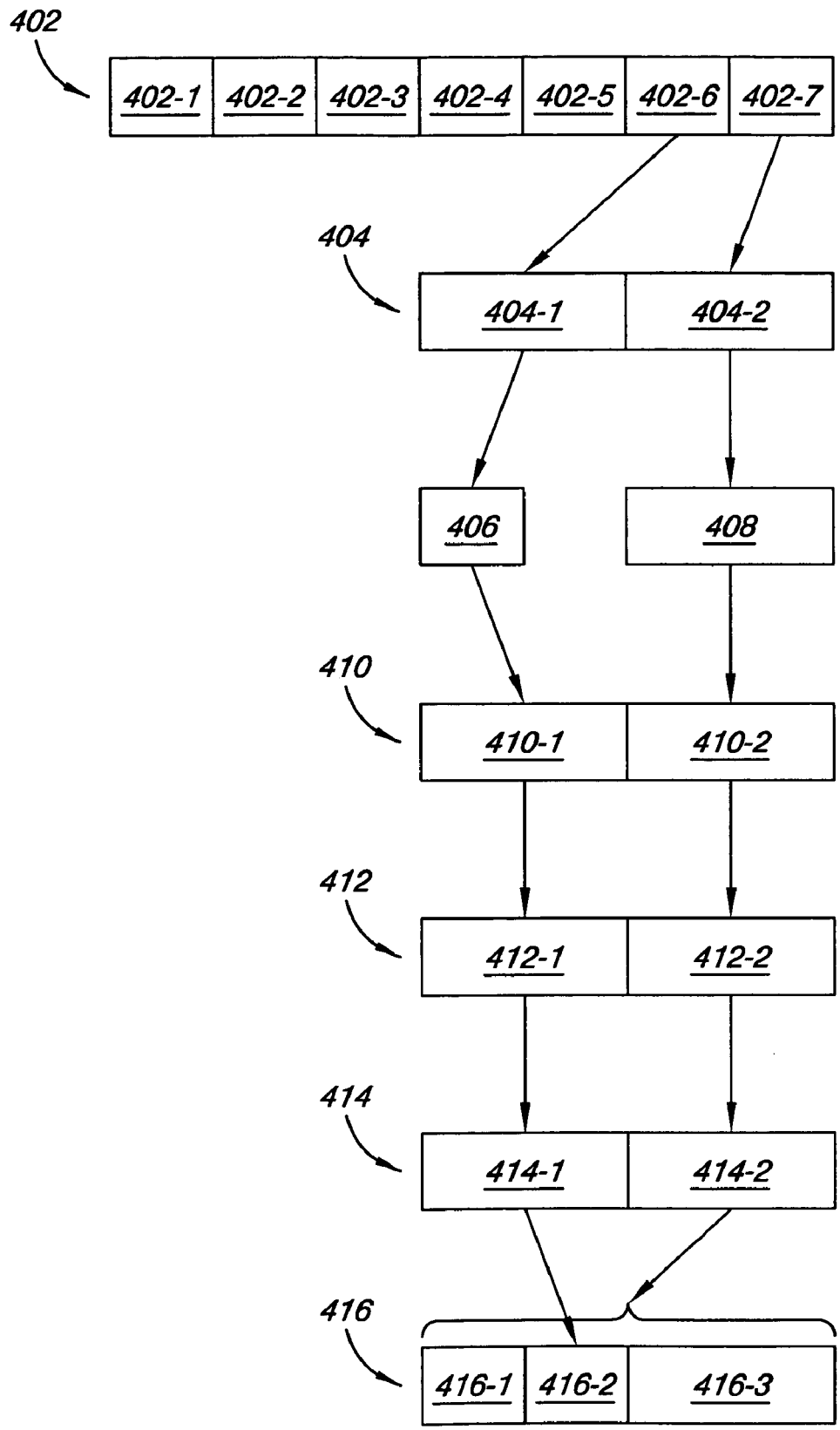
FIG. 4 illustrates another sequence embodiment for data packet configuration.

FIG. 4 illustrates another sequence embodiment for data packet configuration. FIG. 4 illustrates an embodiment for packet encapsulation as packets are sent to any network port on a given network chip from the processor via a network chip having a conduit port, as the same has been described above. As note above, processed packets are forwarded from the processor back to an external network port or to local processing on a given network chip via a conduit port on a particular network chip selected from among a number of network chips on a network device. The processor similarly includes logic circuitry for forwarding the packets to the conduit port on one or more of the network chips.

FIG. 4 illustrates one embodiment by which the logic circuitry on the one or more network chips operates on received packets to send the packets from the processor to local processing on a given network chip and/or out an external port on a given network chip. FIG. 4 illustrates an embodiment by which the processor is adapted to add additional data, for additional functionality, to certain packets in order to send the packets to local processing on a given network chip and/or out an external port on a given network chip.

As shown in FIG. 4 the processor includes logic circuitry and/or software to encapsulate media access controller (MAC) destination address (DA) information 402-1 (such that a network chip can filter packets based on a DA), to encapsulate source address information 402-2, to encapsulate virtual LAN tags (if present) 402-3, to encapsulate length and type information 402-4, and to encapsulate PAD/CTL type information 402-5, etc, on data packet structure 402. The processor is also adapted to add data for additional functionality among the number of network chips on the device relating to processing the packet, e.g., to add explicit forwarding instructions, to add information relating to whether the packet has already been transmitted from an external port on the device, etc, within block 402-6.

The packet, illustrated at 402, will additionally include the original Ethernet packet 402-7. Once this encapsulation is performed, the data packet can be sent to and operated on by the network chip having the conduit port, as the same has been described above. That is, according to the various embodiments, logic circuitry is provided to the network chips having a conduit port which can serve as a filter to operate on packets received from the processor. It is noted that not only can the encapsulation include encapsulation data to aid with filtering which packets are operated on by a particular network chip, but additionally the encapsulation data can provide additional data to assist in passing the original Ethernet packet 402-7 through an internal switching fabric and through an internal (to the device) hub and/or switch, etc.

Once the filter strips off the encapsulation and operates on the received packet, the packet will appear as the packet data structure 404. That is, the packet will include the additional data for the added functionality, now shown as 404-1, and with include the original Ethernet packet, now shown as 404-2. The logic circuitry of the network chip can strip off the additional data for the added functionality as shown at 406 and can operate thereon to determine what to do with the remaining original packet 408.

As shown in the embodiment of FIG. 4, network chip can use the additional information derived from the added data 406 to add an internal switch header structure 410-1 to the Ethernet packet 410-2 such that the data packet structure 410 can be forwarded to the switching fabric. As illustrated with data packet structure 412, as the data packet is transmitted across the switching fabric of the device it can be operated on again to modify the internal switch header structure 412-1 attached to the Ethernet packet 412-2. And, again when the data packet structure 414 is in the outbound memory structure of the intended network chip the packet can again be operated on to modify the internal switch header structure 414-1 attached to the Ethernet packet 414-2.

Thus, once the network chip having the conduit port has operated on the above described data packet structure, the data packet can be operated on by local processing on that network chip having the conduit port and/or forwarded through the switching fabric of the device to another network chip.

Data packet structure 416 illustrates the data packet once again as an Ethernet frame packet. As illustrated in data packet structure 416, the Ethernet frame packet 416 can include a first portion 416-1 of the certain initial number of bytes of the original packet, shown as 302 in FIG. 3, which represent destination and source address information. The Ethernet frame packet 416 can include certain information tags taken from the internal switch header 414-1, now shown as 416-2. And, the Ethernet frame packet 416 can include the rest of the original packet 416-3, shown as 302 in FIG. 3, including length and type information and the rest of the packet contents, as the same will be known and understood by one of ordinary skill in the art.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device, comprising:
    a processor with at least one media access control-physical layer type conduit port responsible for processing packets on the network device;
    a high speed interconnect;
    a number of network chips coupled to one another through the high speed interconnect;
    wherein the number of network chips have a media access control-physical layer type conduit port which can be selectively chosen to bi-directionally exchange packets with the processor; and
    wherein a network chip adds additional data, for additional functionality, to certain packets in order to send the certain packets to the processor.

2. The network device of claim 1, wherein the packets are Ethernet frame packets and each network chip encapsulates packets and additional data for added functionality intended for the processor to maintain an appearance of an Ethernet frame format.

3. The network device of claim 1, wherein each network chip adds data to each packet for the processor relating to processing the packet.

4. The network device of claim 1, wherein each network chip is adapted to add data to each packet for prioritizing packets to the processor.

5. The network device of claim 1, wherein each network chip adds information to each packet relating to an external port on which a given packet arrived to the network device.

6. The network device of claim 1, wherein each network chip adds information to each packet for the processor relating to whether the packet has already been transmitted from an external port.

7. A network device, comprising:
    a number of network chips coupled to one another through a high speed interconnect of the network device, the number of network chips having a media access control-physical layer type conduit port which can be selectively chosen to bi-directionally exchange packets, received to any network chip on the network device, with a processor responsible for processing packets;
    wherein the processor includes at least one media access control-physical layer type conduit port to receive packets from a selected media access control-physical layer type conduit port on one of the number of network chips; and
    wherein each network chip and the processor adds data for additional functionality to each packet to facilitate sending the packets via the at least one media access control-physical layer type conduit port of the processor and the selected media access control-physical layer type conduit port on one of the number of network chips.

8. The network device of claim 7, wherein the processor includes data to encapsulate both a packet and the data for additional functionality whereby each network chip can filter packets.

9. The network device of claim 8, wherein the processor includes data to encapsulate both a packet and the data for additional functionality whereby each network chip can filter packets based on a media access controller (MAC) destination address (DA).

10. The network device of claim 7, wherein the packets are Ethernet frame packets, and wherein each network chip and the processor encapsulates the packets to maintain an appearance of an Ethernet frame format.

11. The network device of claim 7, wherein each network chip and the processor adds data selected from the group of:
    data for the processor relating to processing the packet;
    data for prioritizing packets to the processor;
    data to filter packets based on a media access controller (MAC) destination address (DA);
    data to add information relating to an external port on which a given packet arrived to the network device;
    data to add information relating to explicit forwarding instructions; and
    data to add information relating to whether the packet has already been transmitted from an external port.

12. The network device of claim 7, wherein the processor exchanges packets with the selected media access control-physical layer type conduit port on one of the number of network chips through a multiplexor and a buffer.

13. The network device of claim 12, wherein the selected media access control-physical layer type conduit port is selected by the multiplexor and sends packets to an input side of the at least one media access control-physical layer type conduit port of the processor, and an output side of the at least one media access control-physical layer type conduit port of the processor is broadcast through the buffer to an input side of the number of network chips.

14. The network device of claim 7, wherein each of the at least one media access control-physical layer type conduit port of the processor and the conduit ports of the number of network chips is an IEEE 802.3 media access control (MAC) port.

15. A network device, comprising:
a number of network chips coupled to one another through a high speed interconnect on the network device;
a processor responsible for processing packets, received to any network chip on the network device, wherein the processor includes at least one media access control-physical layer type conduit port to receive packets from the number of network chips; and
means for adding additional data for additional functionality to each packet to facilitate sending each packet via the at least one media access control-physical layer type conduit port, and passing the packets through a switching structure in a conduit path between the at least one media access control-physical layer type conduit port of the processor and a media access control-physical layer type bi-directional conduit port on each of the number of network chips while maintaining a predetermined packet format.

16. The network device of claim 15, wherein the network device includes means for signaling different actions on receiving ends of the device, including:
putting incoming traffic into different queues based on a copy reason; and
filtering which packets are accepted by which network chips.

17. The network device of claim 16, wherein the copy reason includes whether a given packet is a learn packet, a sample packet, and a management packet.

18. The network device of claim 17, wherein the means includes hardware filtering logic on each of the network chips such that each network chip can operate on packets received from the at least one media access control-physical layer type conduit port of the processor.

19. A method for moving packets on a network device, comprising:
receiving packets to a number of network chips, the number of network chips having a media access control-physical layer type conduit port which can be selectively chosen to bi-directionally exchange packets with at least one media access control-physical layer type conduit port of a processor responsible for processing packets;
adding additional data for additional functionality to each packet to enable sending the packets via the at least one media access control-physical layer type conduit port of the processor and the selected media access control-physical layer type conduit port on one of the number of network chips;
using a high speed interconnect to connect a number of network chips on the network device; and
wherein adding additional data includes encapsulating each packet to maintain a predetermined packet format.

20. The method of claim 19, wherein the method include receiving Ethernet frame packets and encapsulating each packet with additional data while maintaining an appearance of an Ethernet frame format.

21. The method of claim 20, wherein adding additional data includes adding data selected from the group of:
data for the processor relating to processing the packet;
data for prioritizing packets to the processor;
data to filter packets based on a media access controller (MAC) destination address (DA);
data to add information relating to an external port on which a given packet arrived to the network device;
data to add information relating to explicit forwarding instructions; and
data to add information relating to whether the packet has already been transmitted from an external port.

22. A method for moving packets on a network device, comprising:
coupling a number of network chips to one another through a high speed interconnect on the network device, the number of network chips having a media access control-physical layer type conduit port which can be selectively chosen to bi-directionally exchange packets with at least one media access control-physical layer type conduit port of a processor responsible for processing packets;
receiving Ethernet frame packets to external ports on the number of network chips; and
adding additional data for additional functionality to packets intended for the processor to enable sending the packets via the at least one media access control-physical layer type conduit port of the processor and the selected media access control-physical layer type conduit port on one of the number of network chips; and
encapsulating each packet to maintain an appearance of Ethernet frame format.

23. The method of claim 22, wherein adding additional data includes adding data selected from the group of:
data for the processor relating to processing the packet;
data for prioritizing packets to the processor;
data to filter packets based on a media access controller (MAC) destination address (DA);
data to add information relating to an external port on which a given packet arrived to the network device;
data to add information relating to explicit forwarding instructions; and
data to add information relating to whether the packet has already been transmitted from an external port.

24. The method of claim 23, wherein the method includes broadcasting encapsulated packets from the processor to a subset of the number of network chips and forwarding the broadcast output to an external port.

25. The method of claim 24, wherein the method includes providing hardware filtering logic on each of the number of network chips such that each network chip can operate on packets received from the processor.

26. The method of claim 23, wherein the method includes broadcasting encapsulated packets from the processor to a subset of the number of network chips and forwarding the broadcast output to local processing on another network chip via the high speed interconnect.

* * * * *